United States Patent
Goose et al.

(10) Patent No.: US 8,315,158 B2
(45) Date of Patent: Nov. 20, 2012

(54) METHODS AND APPARATUS FOR DECENTRALIZED RAPID RECOVERY FOR ETHERNET RINGS

(75) Inventors: Stuart Goose, Berkeley, CA (US); Minh Huynh, Davis, CA (US); Raymond Rui-Feng Liao, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 76 days.

(21) Appl. No.: 12/248,602

(22) Filed: Oct. 9, 2008

(65) Prior Publication Data
US 2009/0274044 A1 Nov. 5, 2009

Related U.S. Application Data

(60) Provisional application No. 61/049,728, filed on May 1, 2008.

(51) Int. Cl.
*G01R 31/08* (2006.01)
(52) U.S. Cl. ......... 370/222; 370/392
(58) Field of Classification Search .......... 370/216, 370/217, 221, 222, 223, 225, 389, 392
See application file for complete search history.

(56) References Cited

U.S. PATENT DOCUMENTS

| | | | | |
|---|---|---|---|---|
| 6,834,056 B2* | 12/2004 | Hayes | ........... | 370/440 |
| 7,093,027 B1* | 8/2006 | Shabtay et al. | ........... | 709/239 |
| 2007/0263660 A1* | 11/2007 | Mitsumori | ........... | 370/469 |
| 2008/0095047 A1* | 4/2008 | Skalecki et al. | ........... | 370/225 |
| 2009/0073988 A1* | 3/2009 | Ghodrat et al. | ........... | 370/395.53 |
| 2009/0161562 A1* | 6/2009 | Shah et al. | ........... | 370/245 |

OTHER PUBLICATIONS

S. Sharma et al., "Viking: A Multi-Spanning-Tree Ethernet Architecture for Metropolitan Area and Cluster Networks", INFOCOM 2004, Twenty-third Annual Joint Conference of the IEEE Computer and Communications Societies, vol. 4, Issue 7-11, Mar. 2004, pp. 2283-2294 vol. 4.
G. Holland, "Carrier Class Metro Networking: The High Availability Features of Riverstone's RS Metro Routers", Riverstone Networks Technology Whitepaper #135, www.riverstonenet.com, v 1.5, Apr. 2002, pp. 1-15.
S. Shah et al., "Ethernet Automatic Protection Switching (EAPS)", Extreme Networks Whitepaper, www.extremenetworks.com, 2002, 7 pages.
A. Rajagopal, "Achieving Superior Resiliency and Fast Convergence with Foundry's MRP", www.foundrynet.com, 2002-2008, 8 pages.
International Electrotechnical Commission, IEC 62439: High Availability Automation Networks, Final Draft International Standard 65C/495/FDIS, Feb. 2008, 201 pages.
B. Sultan et al., "Fast Chain Recovery With Traffic Engineering", IEEE Whitepaper, http://www.ieee802.org/1/files/public/docs2008/new-sultan-fcr-te-white-paper-0508-v01.pdf, May 8, 2008, 5 pages.

* cited by examiner

*Primary Examiner* — Ricky Ngo
*Assistant Examiner* — Christine Ng
(74) *Attorney, Agent, or Firm* — Donald B. Paschburg (57) ABSTRACT

A telecommunications system including a plurality of switches defining an Ethernet ring; a plurality of virtual local area networks defined on the Ethernet ring, defining a number of virtual local area networks (VLANs) equal in number to the number of links; and a ring recovery system configured to recover from a link failure by rerouting traffic to a destination on the Ethernet ring via a VLAN not including a failed link.

18 Claims, 12 Drawing Sheets

METHODS AND APPARATUS FOR DECENTRALIZED RAPID RECOVERY FOR ETHERNET RINGS

CROSS REFERENCE TO RELATED APPLICATIONS

This application claims priority from Provisional Application No. 61/049,728 filed May 1, 2008, which is hereby incorporated by reference in its entirety as if fully set forth herein.

BACKGROUND OF THE INVENTION

The most common technology used for local area networks is the Ethernet protocol, which has been the predominant technology within enterprises for more than thirty years. Ethernet is a relatively simple and cost-effective protocol.

Within the industrial automation domain, until fairly recently proprietary networking solutions were commonplace. However, due to reasons of cost and simplicity, Ethernet has been gaining traction in the industrial automation market. Lost production time in factory environments can prove very costly. Therefore, network reliability and resilience is of critical importance. Ethernet has intrinsic mechanisms for recovering from a fault, but these native mechanisms are too slow for industrial automation requirements.

As such, there is need for an improved Ethernet recovery mechanism.

SUMMARY OF THE INVENTION

This invention generally relates to telecommunications systems. More particularly, this invention relates to an Ethernet ring recovery system and method, according to various embodiments.

According to specific embodiments, this invention includes systems, methods, and computer program products for rapid recovery of Ethernet rings. According to some embodiments, a virtual local area networks (VLAN) is defined for each link in a given ring. Thus, at any time, there are two paths (primary and backup) for traversing the ring. The rapid ring recovery (RRR) system of embodiments of the present invention detects a failure of a link and re-routes traffic temporarily onto an alternative VLAN path.

In particular, embodiments of the present invention define a plurality of VLANs around an Ethernet ring. When a link is identified as having failed, traffic is rerouted on an alternate VLAN using a MAC_IN_MAC "tunnel." Packets are analyzed based on whether they are Local or Ring traffic; a MAC_IN_MAC header is added to all Ring traffic; tunneling is activated for recovery traffic on a backup VLAN. Advantageously, embodiments of the present invention are capable of performing recovery autonomously, i.e., without needing a separate control protocol. In some embodiments, a recovery time for routing traffic onto the VLAN is approximately 1 millisecond for a ring having 10 switches and approximately 12 milliseconds for a ring having 200 switches

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Embodiments of the present invention provide for re-routing traffic temporarily onto a sub-optimal path of a ring network by switching between traffic among virtual local area networks (VLANs). Thus, embodiments of the present invention define a plurality of VLANs to be deployed on the ring. In particular, in some embodiments, a number of VLANs equal to the number of links is deployed. In particular, in some embodiments, one VLAN is preconfigured for each specific link failure. By having one VLAN per link, even in the event of a link failure, a path from any source to any destination can be guaranteed.

Figure 1A:
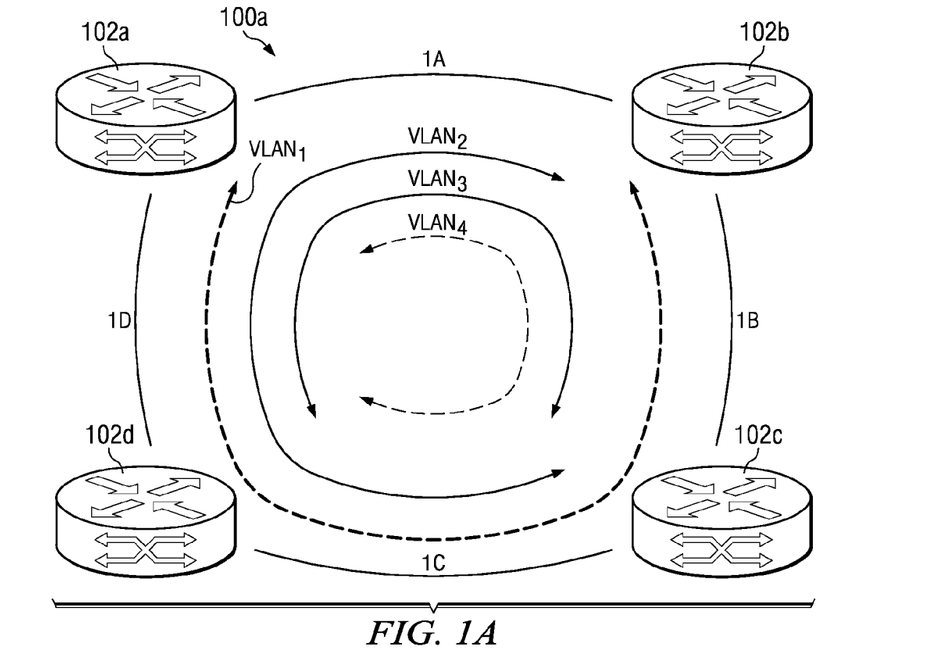
FIG. 1A and FIG. 1B illustrates exemplary operation of embodiments of the present invention.
Figure 1B:
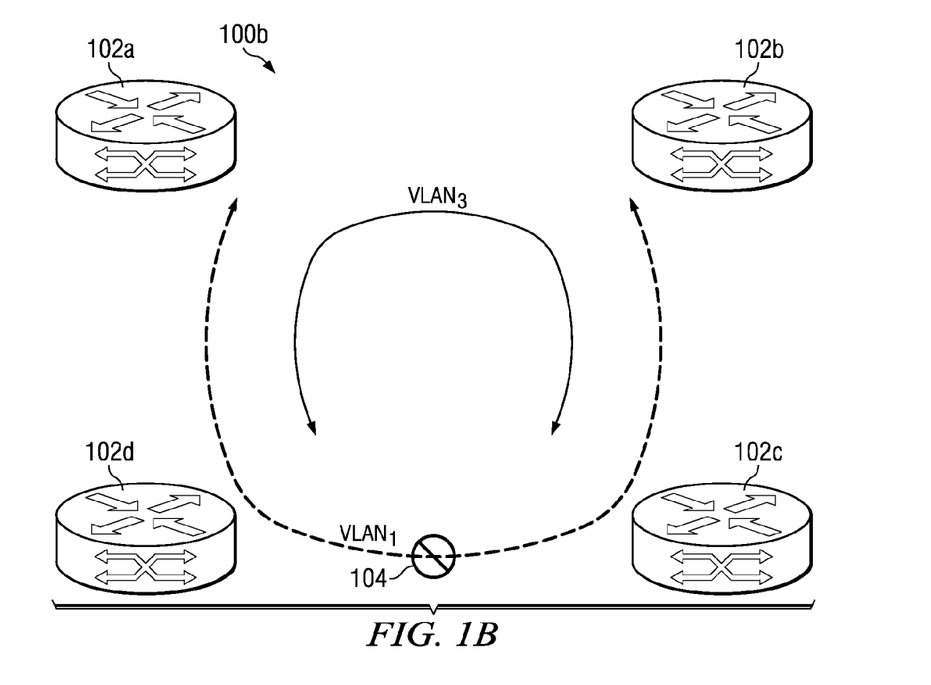

This is illustrated by way of example in FIG. 1A and FIG. 1B. FIG. 1A illustrates a local area network ring topology 100a, which may be an Ethernet ring, including a plurality of switches 102a-102d. Links 1A, 1B, 1C, and 1D link adjacent switches. In particular, link 1A links switches 102a, 102b; link 1B links switches 102b and 102c; link 1C links switches 102c and 102d; and link 1D links switches 102d and 102a.

As shown in FIG. 1A, VLAN1 is defined to include links 1B, 1C, and 1D; VLAN2 is defined to include links 1A, 1D, and 1C; VLAN3 is defined to include links 1D, 1A, and 1B; and VLAN4 is defined to include links 1A, 1B, and 1C. In general, in some embodiments, the VLANs are defined as including all links from a given switch to an adjacent switch, but not including the link between the given switch and adjacent switch (i.e., the "far" or "other" way around the ring). In this way, a VLAN will always be available for routing in the event of a link failure.

For example, as shown in FIG. 1B, a failure of link 1C (between switches 102c, 102d), denoted by reference numeral 104, is detected as a failure of VLAN1; the system according to embodiments of the present invention re-routes traffic immediately to VLAN3, thus linking switches 102c, 102d the "long" way.

As will be explained in greater detail below, the Rapid Ring Recovery system of the present invention may be implemented, according to a specific embodiment, as a field programmable gate array (FPGA) in each of the switches. As will be explained in greater detail below, embodiments of the present invention distinguish between Local and Ring traffic; tunneling is implemented for traffic that is rerouted on a backup VLAN.

Figure 2A:
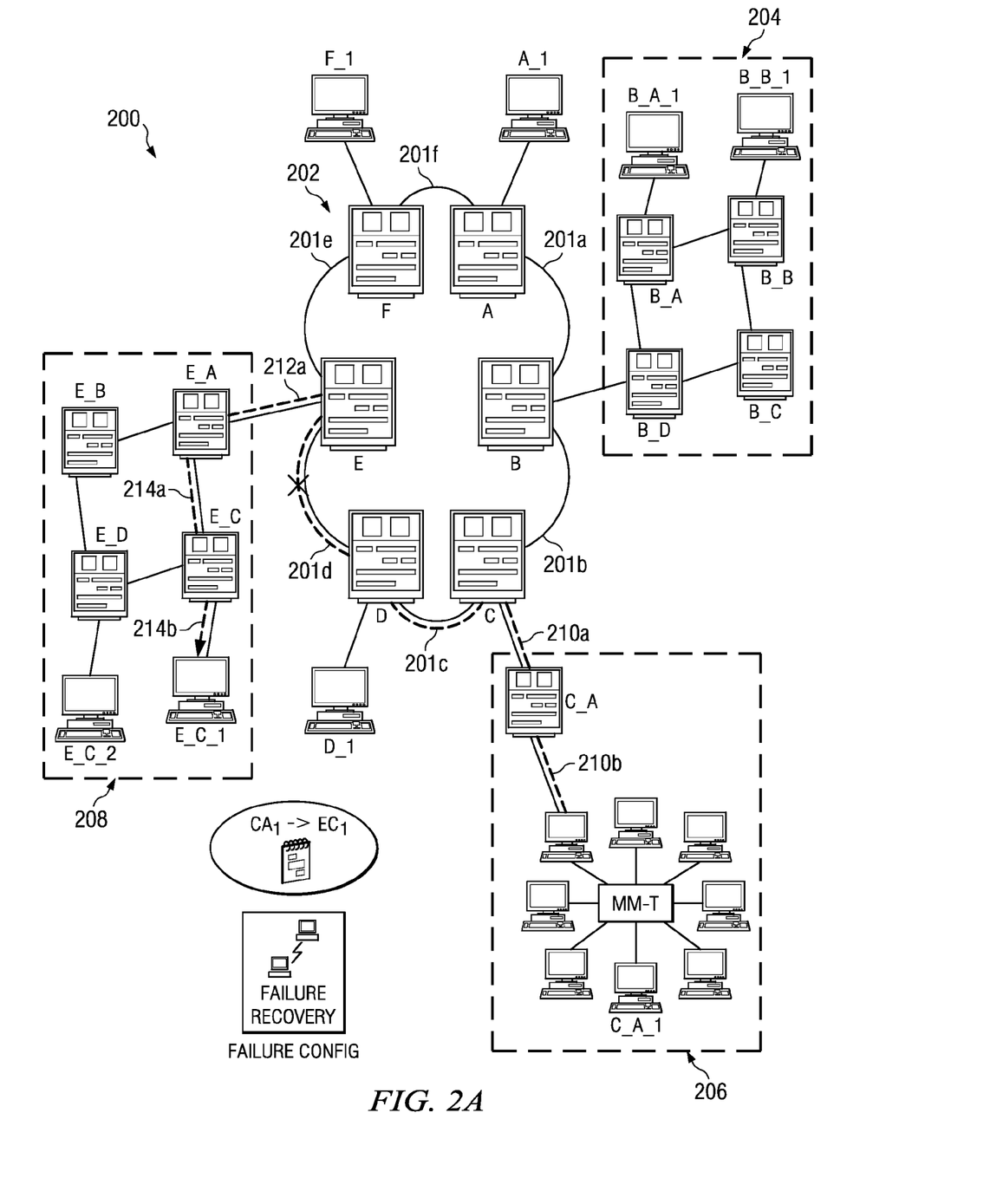
FIG. 2A-FIG. 2D illustrate exemplary operation of embodiments of the present invention.

Another example of operation is shown in FIG. 2A-FIG. 2D. In particular, shown in FIG. 2A is a network system 200 including an Ethernet ring 202 including switches A-F linked to adjacent switches via links 201a-201f, respectively. As will be explained in greater detail below, VLANs are defined for each of the adjacent pairs of switches.

Each switch A-F on the ring may function as a gateway or bridge to other network subsystems or elements. Network elements may include, for example, other switches, nodes, or endpoints. Network subsystem may include a network of such elements.

As shown, switch A links to network element A_1; switch B links to network subsystem 204; switch C links to network subsystem 206; switch D links to network element D_1; switch E links to network subsystem 208; and switch 204f links to network element F_1.

Network subsystem 206 includes a gateway switch C_A linked to switch C via link 210a and to an endpoint C_A_1 via link 210b. Network subsystem 208 includes a gateway switch E_A linked to switch E via link 212a and further linked to switches E_B and E_C. Switch E_D links to endpoint E_C_2. Switch E_C links to endpoint E_C_1 via link 214b and to the gateway switch E_A via link 214a.

Operation of an embodiment of the present invention may be illustrated by a hypothetical communication between node C_A_1 and node E_C_1. As shown by the heavy dotted line, the communication travels over links 210b, 210a, 201c, 201d, 212a, 214a, and 214b. In the example illustrated, link 201d fails.

Figure 2B:
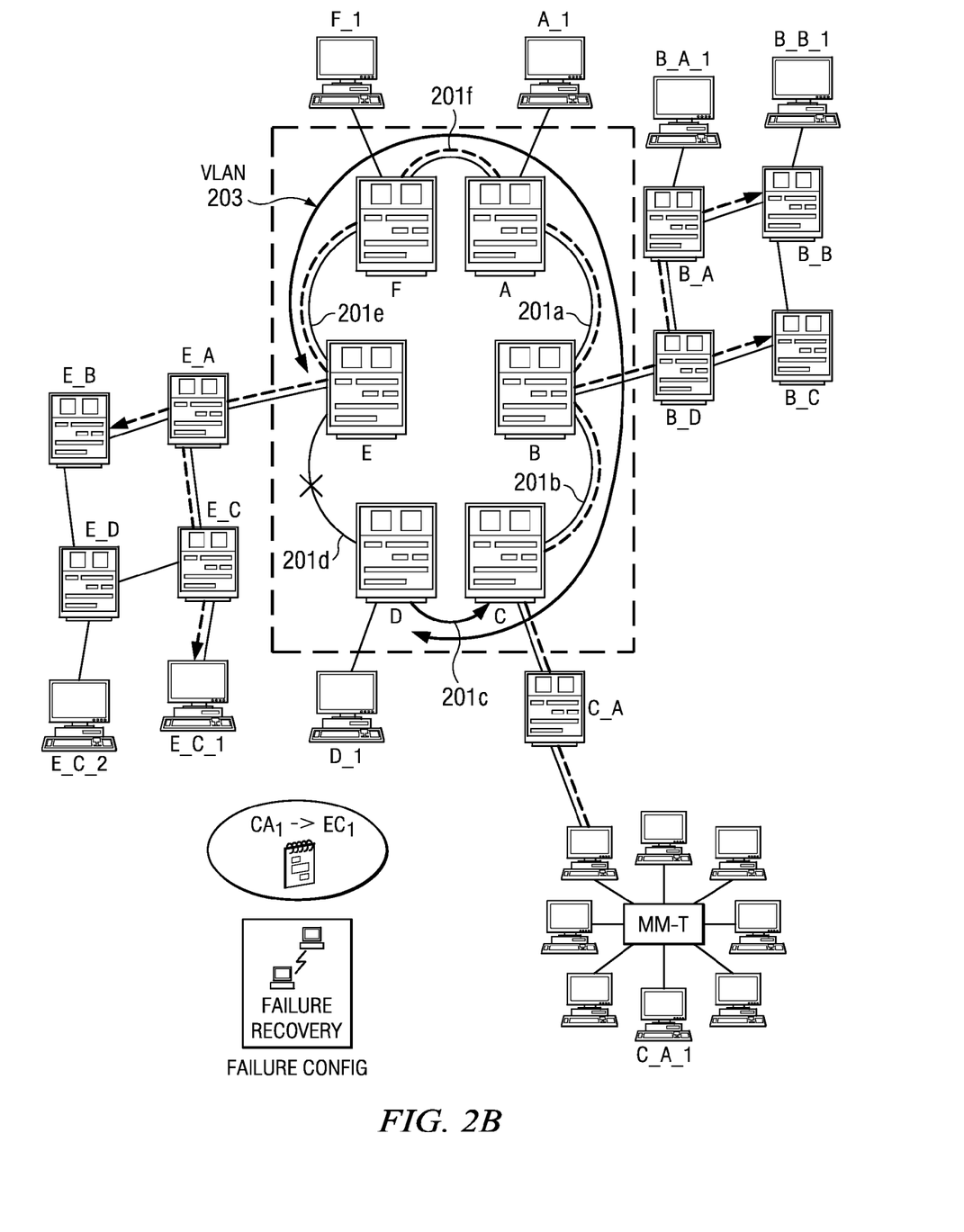

In operation, as shown in FIG. 2B, switch D can detect the failure of the link 201d and re-route the packet flow back onto the VLAN 203 defined by links 201a, 201b, 201c, 201e, and 201f. Initially, the switch D receives packets from the switch C and routes them back so that flow will be along the VLAN 203. Thus, in some embodiments, sent traffic may be "backtracked," from the switch adjacent the failure (e.g., switch D) to a "bridge" switch (e.g., switch C) depending on where the failure occurred. Traffic is then via the VLAN 203 to the switch E and then to node E_C_1.

Figure 2C:
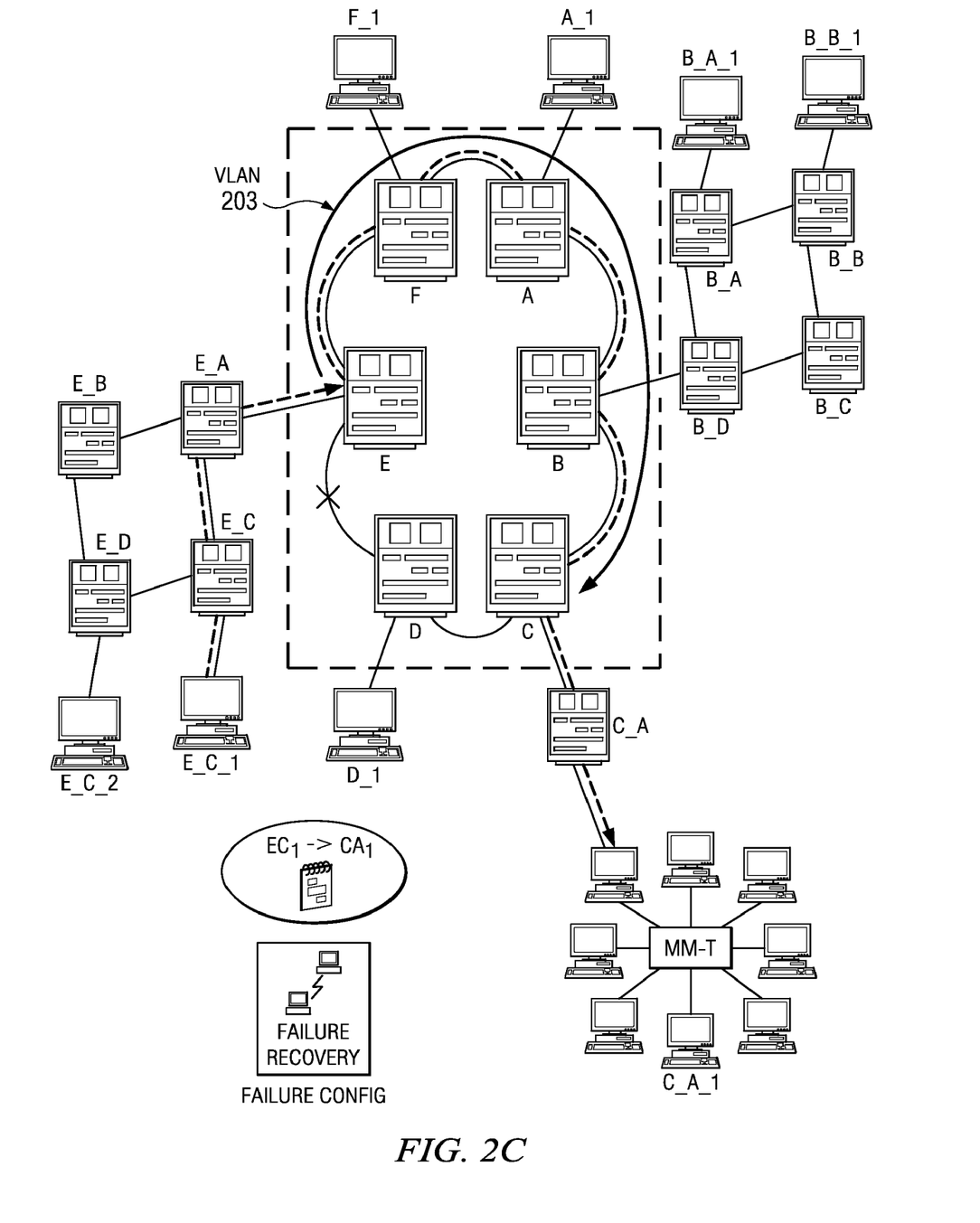
Figure 2D:
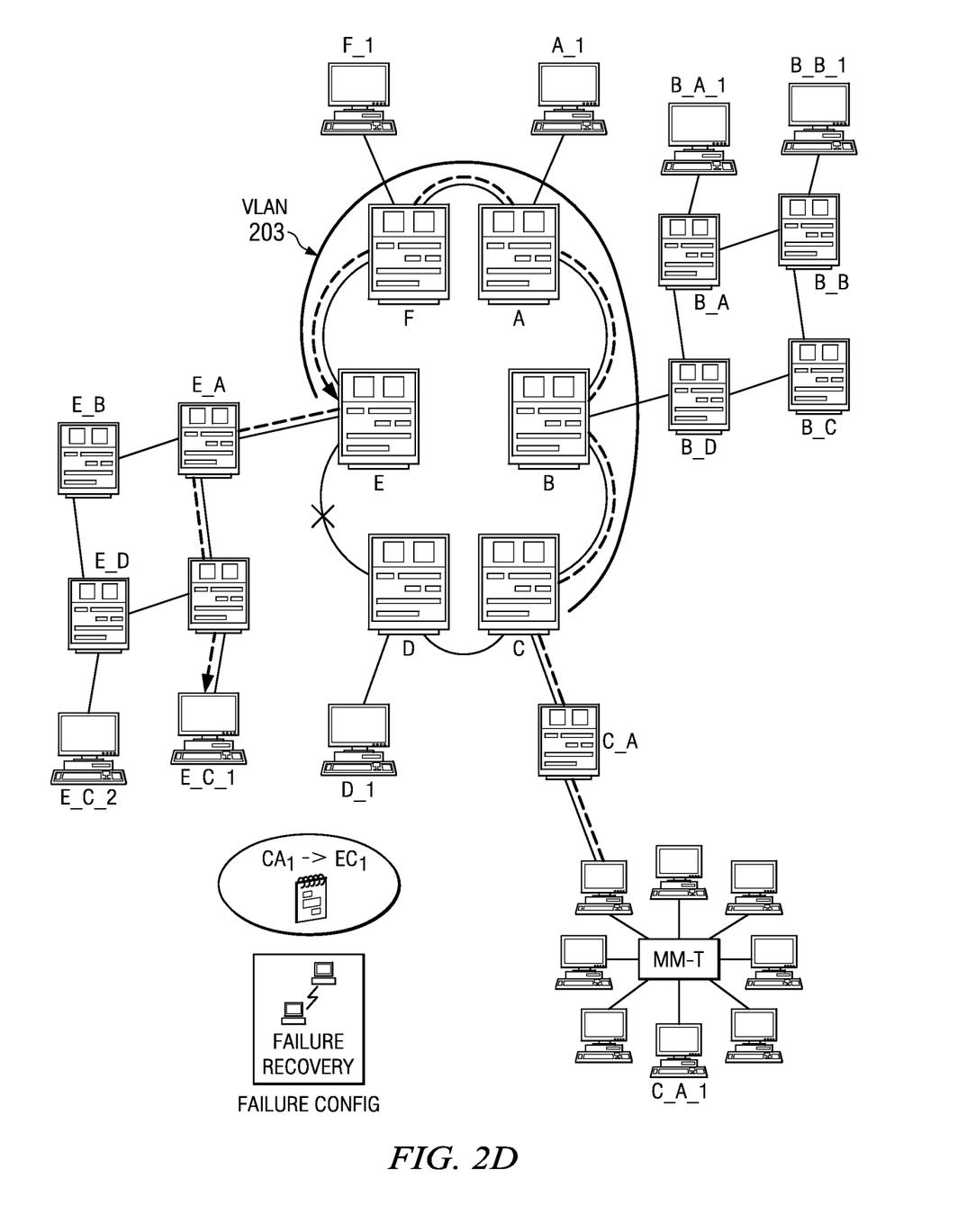

As shown in FIG. 2C, return traffic from the node E_C_1 then travels in the opposite direction on the VLAN 203 until it reaches switch C. The return packets are identified as destined for node C_A_1 and are sent from the switch C to the switch C_A (and thus to the node C_A_1) instead of first going to the switch D and then back to switch C. Thus, return packets do not backtrack. All subsequent traffic on the ring between the nodes can then be directly via switches C and E, without needing to include switch D (for either forward or return traffic), as shown by the dotted line in FIG. 2D.

Figure 3:
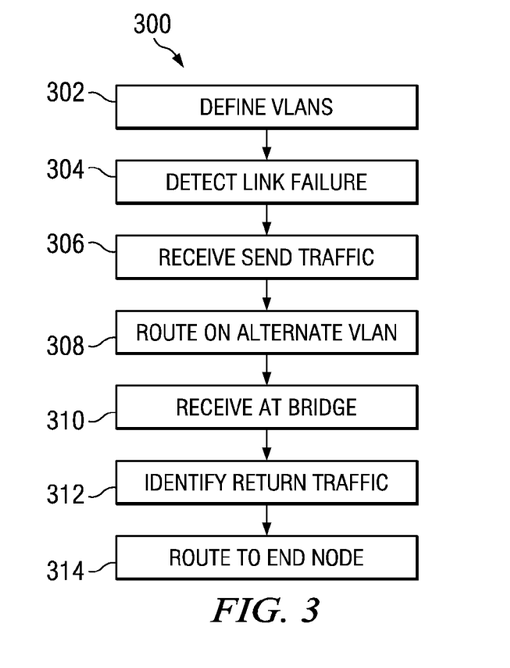
FIG. 3 is a flowchart illustrating operation of an embodiment of the present invention.

Turning now to FIG. 3, a flowchart 300 illustrating operation of an embodiment of the present invention is shown. The particular arrangement of elements in the flowchart 300 is not meant to imply a fixed order to the elements; embodiments can be practiced in any order that is practicable.

Initially in a step 302, a plurality of VLANs may be defined on the network ring and stored in the switches as backup VLAN address tables. As noted above, this typically includes defining a number of VLANs equal to the number of links in the ring and defining VLANs for each pair of adjacent switches the "long" way around the ring. That is, a VLAN is preconfigured for each link that can fail. Defining the VLANs may be accomplished, for example, by a system administrator upon setting up the network.

In a process step 304, a switch can detect a link failure. In particular, a switch can detect a failure of an adjacent link. Such failure detection may occur in a conventional fashion, such as by the switching chip PHY interface detection mechanism.

In a process step 306, the switch will receive Send traffic from a sending node. The Send traffic will include one or more fields identifying the sending and receiving nodes. The switch will determine from this information (and from having detected the failure of the link) that an alternative route, i.e., a backup VLAN is to be used for routing the traffic. Thus, in a process step 308, the switch identifies the appropriate VLAN and routes the send traffic back over the backup VLAN to the adjacent switch bypassing the broken link and causing the traffic to backtrack if necessary. As will be explained in greater detail below, this will include activating a MAC_IN_MAC tunnel for the alternate VLAN. Intervening switches will identify the tunnel and VLAN from information the packets are carrying and will forward the traffic accordingly.

In a process step 310, the Send traffic is received at a bridge switch in the ring (i.e., the end of the tunnel) and sent to the destination node. In a process step 312, Return traffic is identified at the bridge ring switch as corresponding to traffic that was sent via the backup VLAN and is sent back over the same VLAN (assuming the link is still down).

In a process step 314, the other end bridge switch will identify the traffic and stop it from traveling further all the way around the ring to the switch adjacent the fault, and will route the traffic to the end node. All subsequent send traffic will likewise be sent by the intervening node around the VLAN, rather than requiring it to be sent to the original switch on the broken link and without requiring any backtracking.

As will be discussed in greater detail below, the rapid ring recovery (RRR) system of embodiments of the present invention implements frame encapsulation (in some embodiments, MAC-in-MAC encapsulation) of all ring packets and buffers the payload while performing the recovery. Each switch is able to perform detection and recovery autonomously, without requiring stopping ring performance, resetting or coordination, i.e., no control protocol is necessary.

Figure 4A:
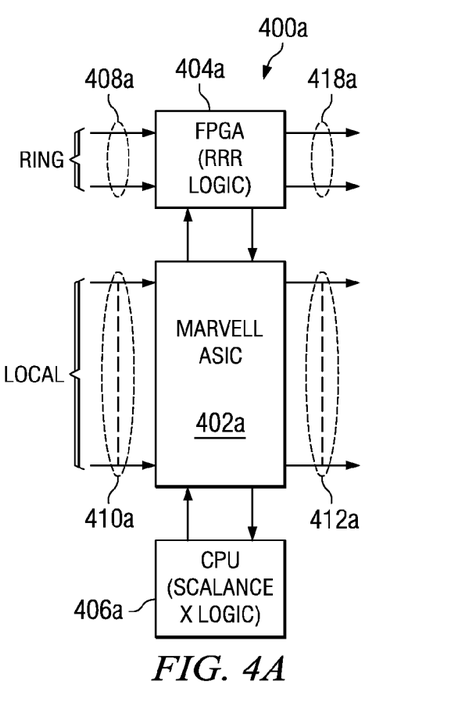
FIG. 4A and FIG. 4B illustrate exemplary switch architecture for embodiments of the present invention.

Turning now to FIG. 4A, a block diagram of an exemplary switch including an RRR system 400a according to embodiments of the present invention is shown. In particular, shown is a switching ASIC 402 operably coupled to a CPU 406a and an FPGA 404a implementing RRR logic in accordance with embodiments of the present invention. In the implementation of FIG. 4A, the FPGA 404a includes Gigabit Ethernet ports 408a, 418a, which implement Ring ports. The switching ASIC 402a implements Local ports 410a, 412a, which may be Fast Ethernet ports. "Ring" ports are ports for packets that travel on the Ring; "Local" ports are for packets that travel on local networks or subsystems.

In the implementation illustrated in FIG. 4A, the FPGA 404a performs the RRR functions and forwards all Ring packets. In a particular embodiment, the switching ASIC 402a may be implemented as the Marvell 88E6095 available from Marvell. In some embodiments, the CPU is implemented as the Scalance X logic CPU available from Siemens.

Figure 4B:
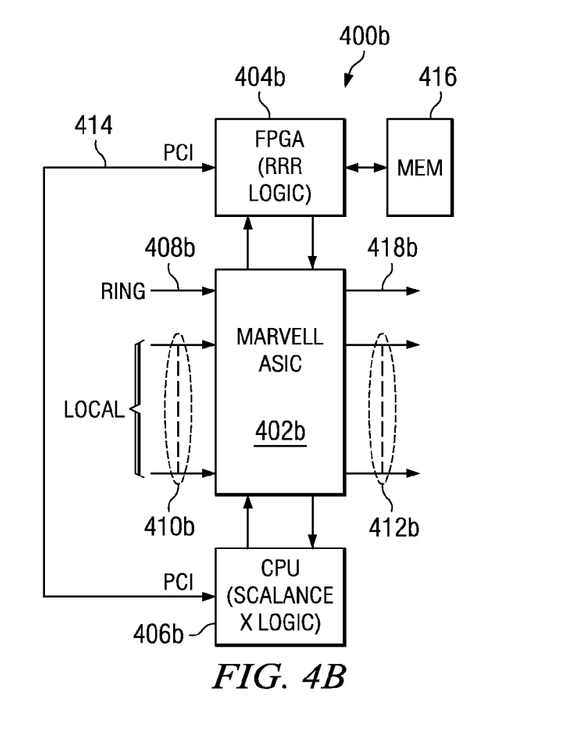

Another implementation is shown in FIG. 4B. In particular, shown in implementation 400b are switching ASIC 402b, FPGA 404b, and CPU 406b. Again, the FPGA 404b implements the RRR logic. In this case, the switching ASIC 402b is on the Ring ports 408b, 418b, as well as the Local ports 410b, 412b. The switching ASIC 402b forwards only packets to and from the Ring (not packets switched within the local mesh) over a GMII (gigabit media independent interface), as will be explained in greater detail below, for processing and returned to the switch 402b for forwarding. A memory 416 for buffering data and storing addressing tables may also be provided. A PCI bus 414 links the CPU 406b and the FPGA 404b. Again, the switching ASIC 402 may be implemented as the Marvell 88E6095 available from Marvell and the CPU is implemented as the Scalance X logic CPU available from Siemens.

According to a specific embodiment, the RRR system uses tunneling implemented by encapsulations and de-encapsulations of packets with an IEEE 802.1ah header depending on the type of port (Ring or Local) that is the source and destination of the packet. The RRR logic on the FPGA uses the switching ASIC ingress and egress ports to add tag fields in the packet header.

Figure 5:
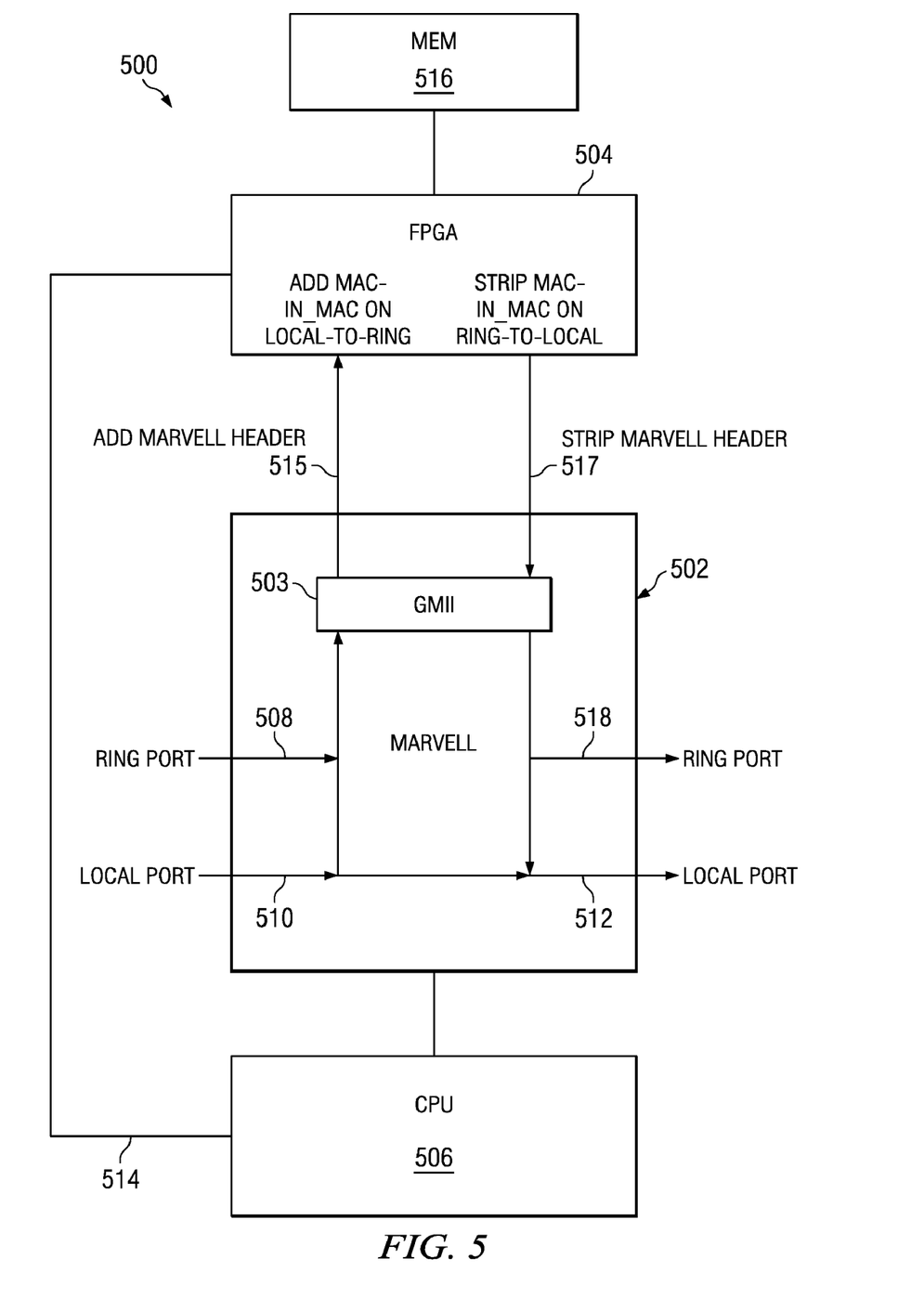
FIG. 5 is a diagram of an exemplary switch for embodiments of the present invention.

This is illustrated more clearly with reference to FIG. 5. As shown, switch 500 includes a Marvell switch ASIC 502, FPGA 504, memory 516, and CPU 506. The switching ASIC 502 includes ring ports 508, 518, and local ports 510, 512. A GMII interface 503 communicates with the FPGA 504. At the egress port 515, the GMII 506 adds an ASIC (Marvell) header. The FPGA 504 then adds a MAC_IN_MAC header on local-to-ring packets. Before the ingress 517, the FPGA 504 strips the MAC_IN_MAC header on ring-to-local packets and the switch ASIC 502 strips the ASIC (Marvell) header. As will be explained in greater detail below, the memory 516 is used to store, among other things, a MAC2VLAN table and a backup address table.

All packets arriving at the ASIC switch 502 have a header installed at the beginning. The header is used to speed VLAN bridging and frame routing. The FPGA 504 uses the Source Port ID (SPID) field in the Marvell Header to learn the source port number to know whether the port is Ring or Local. During FPGA RRR processing, the packets replace the egress (Marvell) header that was added by the egress GMII 515 with the ingress Marvell header format. The ingress GMII 517 strips the Marvell header.

Figure 6:
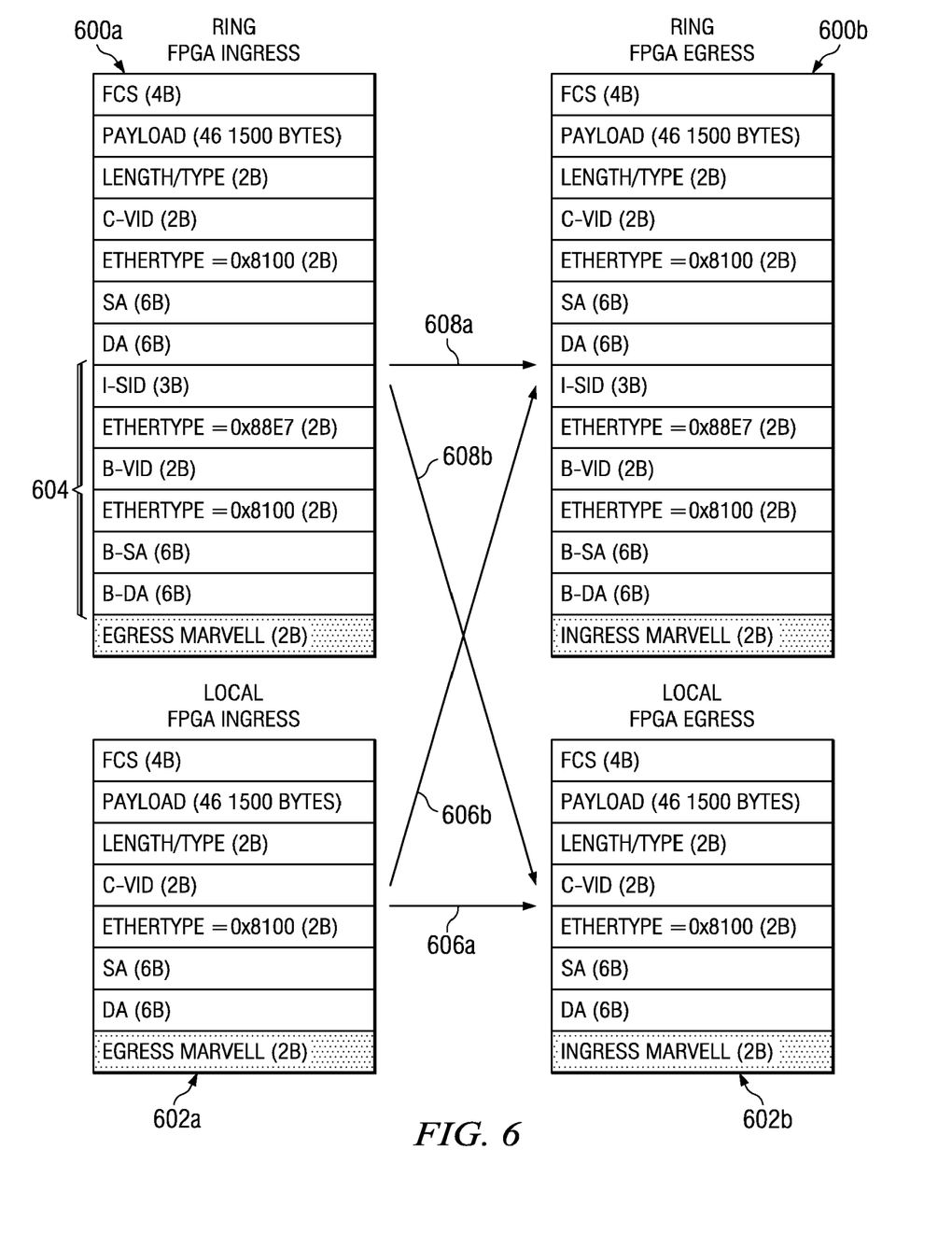
FIG. 6 illustrates packet modifications during processing according to embodiments of the present invention.

FIG. 6 illustrates modifications to the packet depending on whether at ingress or egress, and whether the packet is a Ring or Local packet. Shown at 600a is a Ring packet at ingress, at 600b is a Ring packet at egress, at 602a is a Local packet at ingress and at 602b is a Local packet at egress.

As shown at 600a, a Ring packet includes an Ethernet frame (in common with the Local packet 602a) and may include a Frame Check sequence (FCS), Payload, length/type field, C-VID field, Ethertype field, Source Address (SA), and Destination Address (DA). The C-VID field is a customer VLAN ID, which identifies a local VLAN. Source Address identifies a source node or endpoint, and the Destination Address identifies the destination node or endpoint.

In addition, the Ring packet includes an IEEE 801.1ah or MAC-in-MAC header 604 in accordance with embodiments of the present invention. The MAC-in-MAC header 604 includes an I-SID field, an Ethertype field, a B-VID field, another Ethertype field, a B-SA field and a B-DA field. The I-SID field identifies the packet as a "tunneling" packet, i.e., a packet implementing the recovery mechanism of the present invention, or a standard ring packet. The B-VID field identifies the VLAN on the ring. B-SA and B-DA are source address and destination address, respectively.

The FPGA 504 does not process local to local traffic; it is handled by the switching ASIC 502. However, initially at start up, the FPGA 504 will receive the local to local traffic since the switching ASIC 502 has not learned the local host addresses yet. As for local to ring traffic, ingress Local packets forwarded to a Ring port, as shown at 606b, are encapsulated with the 802.1ah MAC-in-MAC header 604.

Ingress Ring packets 600a forwarded to a Local port, as shown at 608b, are stripped of their 802.1ah MAC-in-MAC header 618.

Figure 7A:
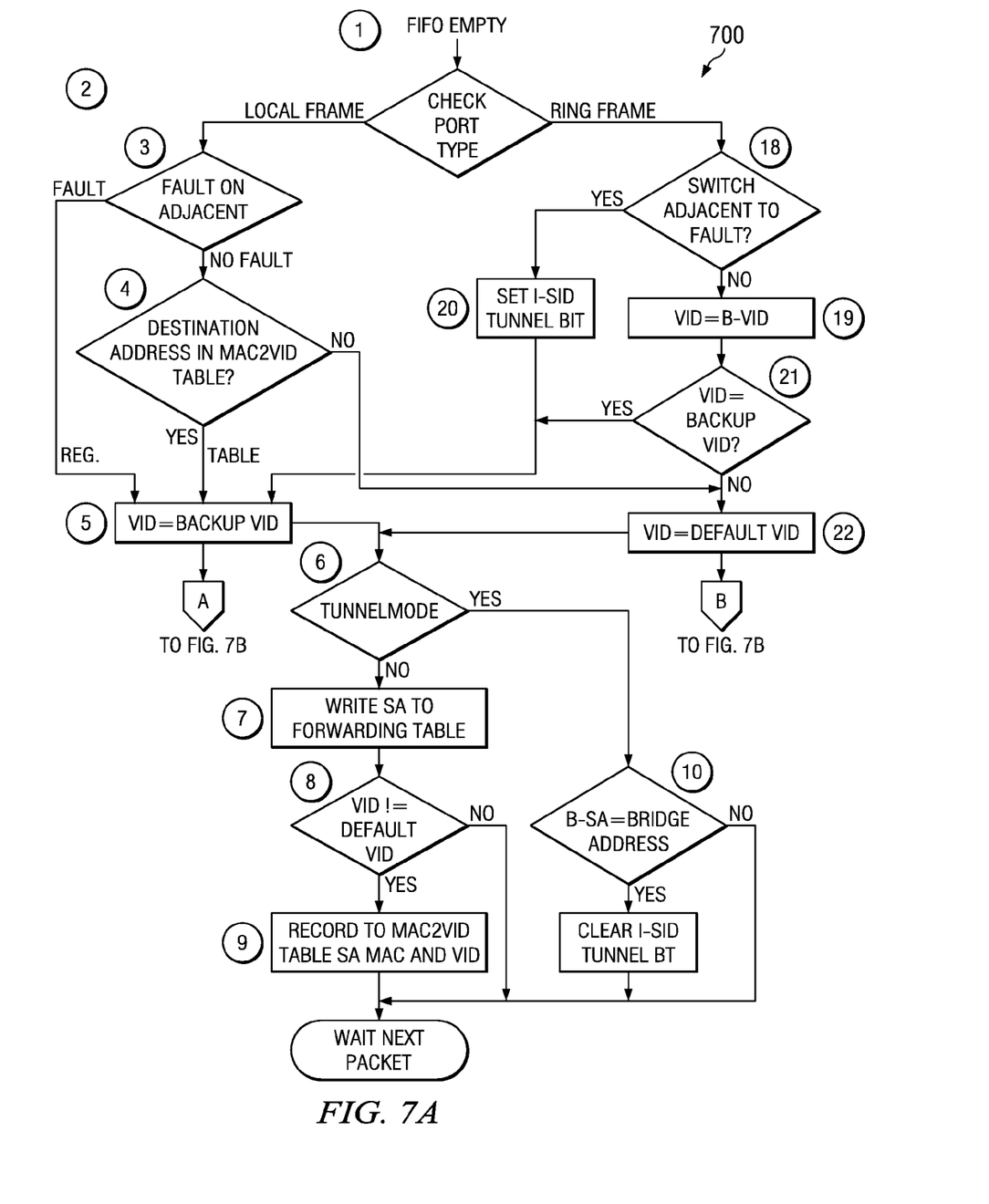
FIG. 7A and FIG. 7B is a flowchart illustrating operation of an embodiment of the present invention.
Figure 7B:
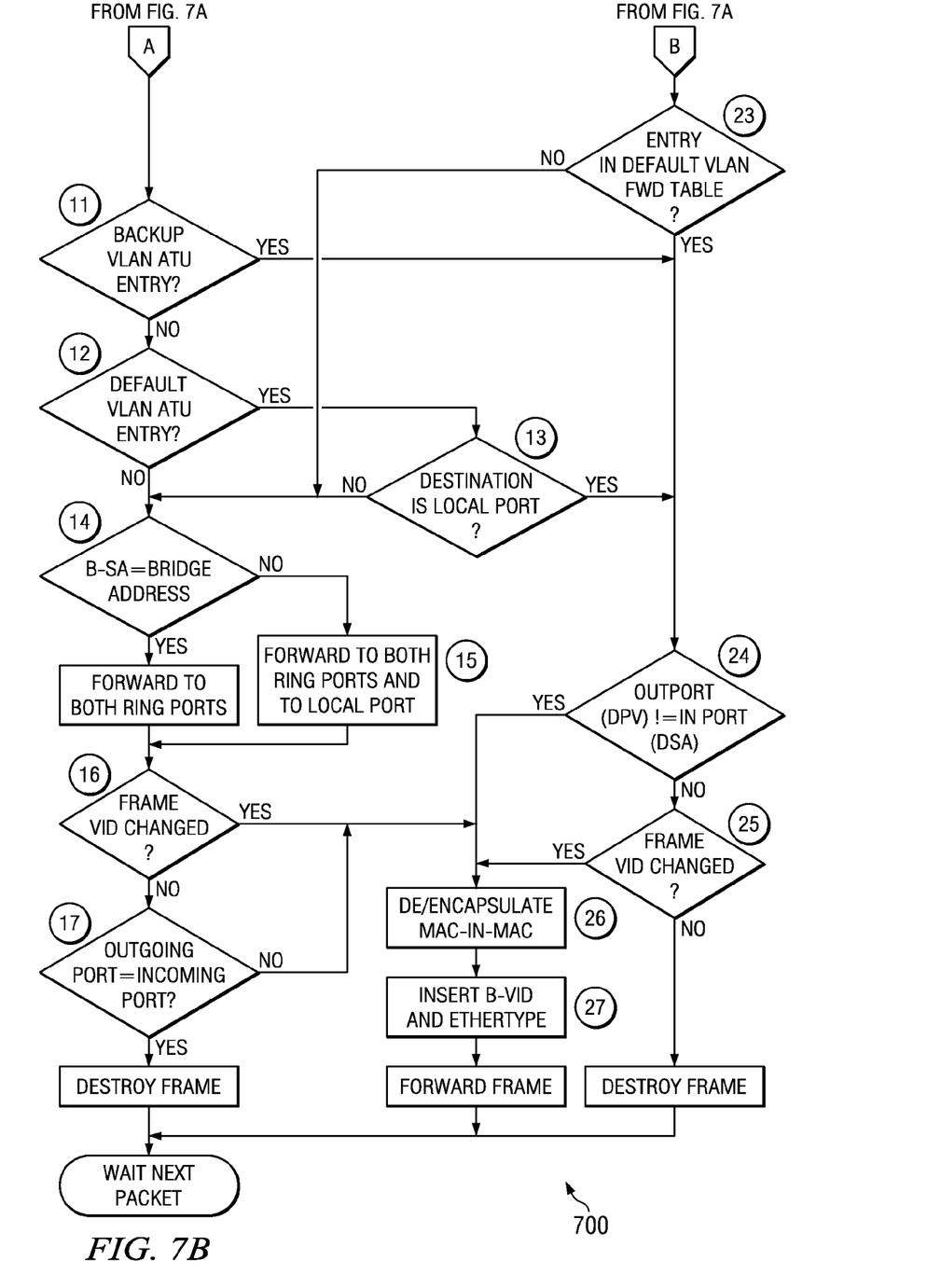

Turning now to FIG. 7A and FIG. 7B, a flowchart 700 illustrating operation of an embodiment of the present invention is shown. The particular arrangement of elements in the flowchart 700 is not meant to imply a fixed order to the elements; embodiments can be practiced in any order that is practicable.

As discussed above, the Marvell GMII port MAC is enabled to tag packets with an Egress Marvell Header tag so that they are received with the tag by the FPGA 504. As will be explained in greater detail below, a finite state machine (FSM) in the FPGA 504 begins RRR processing by using the Egress Marvell Header to distinguish Local port packets from Ring port packets, which follow different paths.

The arrival of a Local packet is detected by a FIFO in the FPGA 504 in a process Step 1. In a process step 2, the FPGA 504 examines the contents of the least significant four bits of the Egress Marvell Header to determine the source port number and, therefore, the port type. We proceed along either a Local packet processing path or a Ring packet processing path.

Some changes to the contents of the header may be required depending on RRR tests as described below. Step 3 tests whether there is a fault in the adjacent node connection. If there is no fault adjacent to the switch, then the RRR system determines the VLAN ID. Thus, the control proceeds to Step 4 where the DA MAC field is compared with the entry in the MAC-to-VLAN ID table corresponding to the packet MAC address (An affirmative indicates that the switch is being used in the recovery or tunnel mode). The contents of the table are derived from Step 9 as will be described in greater detail below. The MAC-to-VLAN ID (MAC2VLAN) table associates a MAC address with a VLAN and is used to route packets along the backup or alternate VLANs. More particularly, the RRR control reads a packet's MAC address and accesses the table to determine its corresponding VLAN and thus appropriate routing. If the entry is not found in the table, then RRR uses the default VID. Thus, among other things, the MAC2VLAN table identifies the VLAN in which the destination MAC address has been learned, preventing reply packets from backtracking on suboptimal paths and enabling a graceful migration to the new path without unnecessary flooding, after the initial reply is received.

If there is a fault in Step 3, the packet will be set to "inside the tunnel" and will get sent on the new backup path. Thus, we set the VLAN ID to a registered Backup value (Backup VID) associated with the Ring port that failed. The registered backup VLAN is one of the recovery VLANs, as discussed above, and is stored previously.

If there was no fault adjacent to the switch in Step 3, but a hit on the table in Step 4, then in Step 5 we set the frame VLAN ID from an original B-VID value to the Backup VID stored in the table (which indicates recovery processing). This Backup value is used as a working ID.

If there is no MAC2VLAN table hit in Step 4, then jump to Step 22 and replace the B-VID field in the header by the port Default VID which is stored in a register (not shown). The register contents can be entered by the system operator.

From Steps 5 and 22 two paths are taken in parallel. Steps 6-10 are referred to as "tunnel" processing and relate to establishing entries for the MAC2VLAN table. In operation, a packet or frame will be marked as inside the tunnel. It will then loop around the Ring until it reaches the end of the tunnel. Consequently, at each switch, the bridge source address is checked to see if it matches the MAC address of the current switch. If so, the tunnel bit is cleared and the packet is sent out as normal traffic.

First in Step 6 we examine the I-SID field (FIG. 6) containing the tunnel information. If tunneling is enabled, then in step 10, the B-SA bridge source address field is compared with the contents of the Bridge address register. That is, the source address is compared with the Bridge address register to determine if the switch is the "last" in the tunnel.

If the packet is not in tunnel mode then in Step 7 the source address (SA) is added to the address or forwarding table (ATU). (This allows for normal handling of the packet). In Step 8, the working VID is compared with a default VID register value, and if they are equal the remaining packet processing is allowed to complete. If in Step 8 the working VID and default VID are not equivalent, indicating backup processing, then the source address and VID are written to the MAC2VID table and the remaining packet processing is completed. In this way the MAC address is associated with the backup VLAN.

From Step 6, if the packet is in tunnel mode, then in Step 10 the B-SA field is compared with the Bridge address register. If they are not equal then the remaining frame processing is completed, otherwise the I-SID tunnel bit is first cleared and then the remaining packet processing is completed.

While performing the tunnel processing, we check to see if there is an entry, i.e., destination address, for the VLAN in the address table (ATU). If so, then the packet is sent out on the appropriate output port. If there is no entry, then we "flood," i.e., send the packet out on both local and ring ports. If the VLAN ID changed to the backup, then the packet is sent back out on the port it arrived on. If it didn't, we just destroy the frame.

Thus we advance from Step 5 to Step 11 to test whether there is an entry in the backup VLAN ATU table using a hashed DA MAC and the VLAN as the table key, as will be described in greater detail below. The ATU table associates a destination port with Source MAC addresses.

In Step 11 the ATU table is accessed to see if the entry is found in the working backup VLAN ID and, if not, we advance to Step 12 to check the ATU for the entry in the Default VLAN table. If the MAC entry is found in the working backup VLAN in Step 11, then at Step 24 it is tested whether the packet is destined for the port that it arrived on. If it is not, then we forward the packet and await the next packet.

If the frame destination port is the same as the port that it arrived on, then it is checked to see whether the original VID has been changed during the packet header processing. If it has changed, then the packet is forwarded, and if it has not then the packet is deleted entirely.

If there is a hit in the default VLAN ATU table in Step 12, then it is determined in Step 13 whether the egress port is Local or Ring from the port number. If it is a local address we proceed to Step 24 as previously described.

If the destination is not local or there was no table hit in Step 12, it is determined in Step 14 whether the sender of the packet is local to the current switch by comparing its B-SA (Bridge Source Address) header field against the B-SA register value. If the values match, the packets are forwarded to both ring ports.

If the B-SA does not match the register value then we proceed to Step 15 then forward to the Ring and Local ports. Forwarding is achieved by setting the bits in the VLAN Table field in the Marvell header.

Whenever a Ring packet is forwarded to a Local port, the MAC-in-MAC header is first stripped. After the forwarding decision, the working VID field is tested to determine if it has changed from the original value in Step 16. If it has not changed then ring loop-back is not allowed and we proceed with the forwarding of the packet to the other Ring port. If the VID has changed, then loop-back is allowed.

If the incoming packet is on a Ring port then we begin at Step 18 to test whether the adjacent ring port is faulted as reported by the MAC. If it is not, then proceed to Step 19 and use the B-VID field from the frame header as a working VID. Step 19 proceeds to Step 21 where we test the working VID for equivalence to the Default VID value. If they are not equal, we move to Step 5 and continue as previously described; otherwise at Step 22 the working VID is assigned to the Default VID register value and then we proceed to Step 23.

If there is an adjacent fault in Step 18, then proceed to Step 20 where we use the contents of the I-SID register for the I-SID field in the packet header to enable tunneling and proceed to Step 5.

From Step 5 or Step 22 we process the tunnel mode as described previously. From Step 22 we also move to Step 23 to test whether there is an entry for the MAC in the Default VLAN Forwarding table. If there is, then we move to Step 24 where we check whether the frame is destined for the port that it arrived on. If not, we proceed to forward it. Otherwise we check whether the VID has changed in Step 25. If the VID has changed, we allow loop back. If it has not changed, destroy the frame.

Encapsulation is performed on packets forwarded from Local to Ring ports. De-capsulation is performed on Ring packets forwarded to Local ports. Packets going from Ring port to Ring port are already MAC-in-MAC encapsulated and leave the switch with the header intact. Packets going from Local port to Local port are never encapsulated.

The GMII egress port adds the Marvell header to egress packets. The port strips the Marvell on ingress. The FPGA replicates the B-VID field and adds an Ethernet type field of value 8100.

Figure 8:
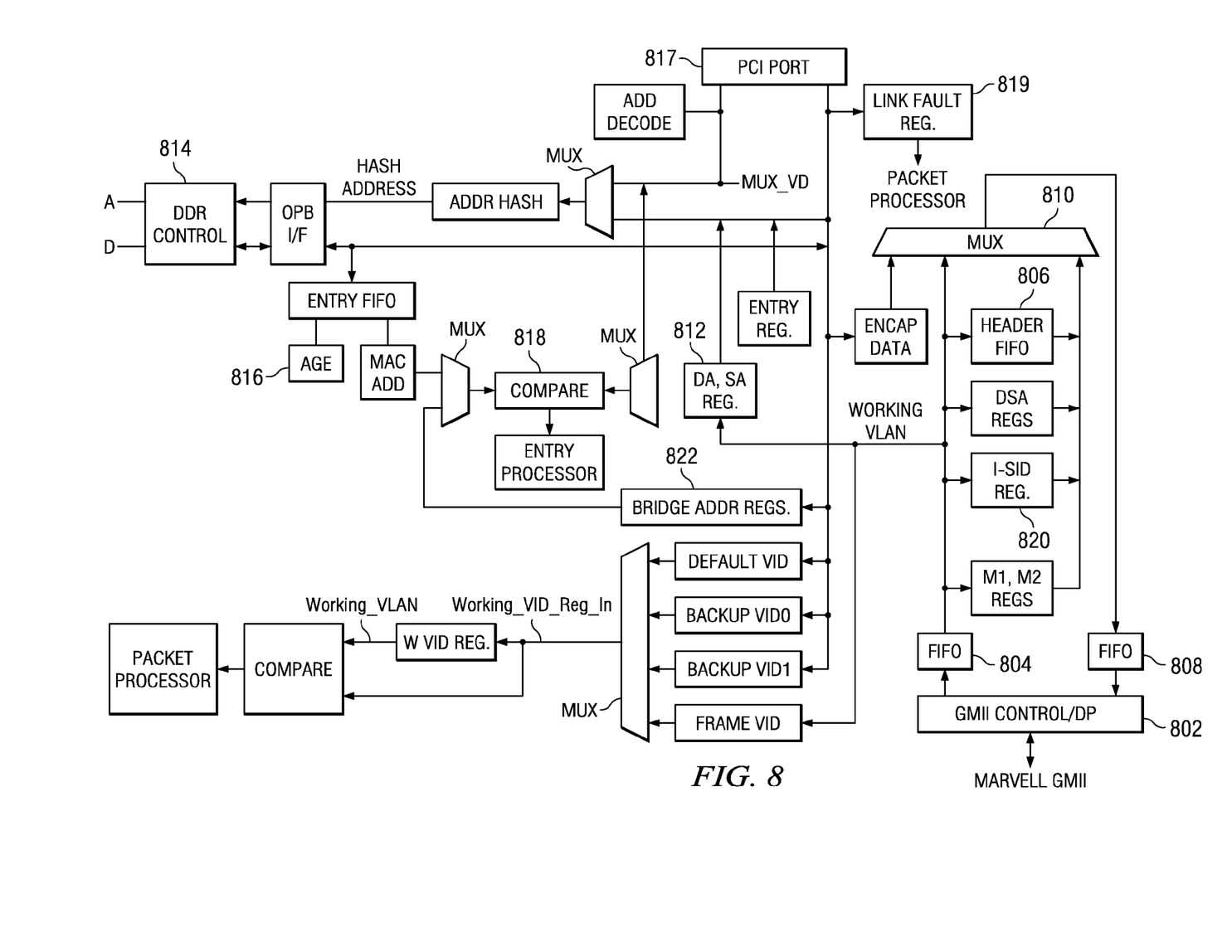
FIG. 8 is a diagram illustrating an exemplary FPGA according to embodiments of the present invention.

According to some embodiments, the design is written in VHDL and will be technology-independent except where vendor-specific functions are used such as dedicated clock manager blocks and vendor macro functions. The architecture 800 of the FPGA 504 according to some embodiments is shown in FIG. 8.

The GMII port 802 is written to by the switch ASIC 502's GMII interface with ingress port packets. Transfers are eight bits wide and are clocked by the switch ASIC 502. Transfers are initiated when the switch ASIC 502 asserts a RX_DV (Receive Data Valid) bit (not shown) signifying data ready. The control 802 then writes the byte into the FIFO 804. When the FIFO empty flag is no longer asserted the RRR control begins processing the packet by reading the header bytes 806 from the FIFO 804. The FIFO 804 writes continue as long as the data valid bit is asserted. When the FIFO 808 outgoing to the switch ASIC 502 has data available, the GMII controller 802 asserts a TX_EN signal (not shown) and writes the packet in FIFO 808 to the switch ASIC 502.

As noted above, the FPGA 504 implements the RRR processing with the packets forwarded from the switch device 502. After RRR processing, the packet is sent back to the ASIC switch 502 with the port number for egress. The controller 802 uses an FSM (finite state machine), comparators and registers to decide what fields to retain or modify in packet headers. The FSM accesses to a local table (not shown). The packet bytes are compared against register and table values. The RRR inserts MAC-in-MAC header bytes at the beginning of Local-to-Ring packets by multiplexing 810 to the outgoing FIFO 808. The balance of the packet that resides in the incoming FIFO 802 is appended to the modified header and written out over the GMII to the ASIC switch 502.

The MAC-in-MAC header of Ring-to-Local packets is stripped in the FPGA 504. The contents of other header fields may be modified by the FPGA during the course of RRR processing.

According to a specific embodiment, the external memory (FIG. 5) is used to store the address translation table (ATU) and MAC2VLAN ID tables. The memory is also used to buffer packets forwarded to Ring or Local ports. The external memory may be implemented in a Micron 512 M DDR, but any memory technology may be used. The DDR is used in 8MByx16 mode. The external memory space is organized as shown in Table 1 below.

TABLE 1

| Address Range | Content |
|---|---|
| 010000-000000 | ATU |
| 020000-010002 | MAC2VLAN ID |
| 028000-020002 | Packet Buffer |
| FFFFFF-028002 | Unused |

The FPGA 504 requires an Address Translation Unit (ATU) to perform the RRR on each packet. Because the FPGA 504 does not have fast access to the table in the switch device 502, the FPGA 504 will write and maintain its own table. The table allows MAC addresses to be established and maintained over bridges (i.e. switches) so that frames may be sent out only over the ports that lead to their destination.

Figure 9:
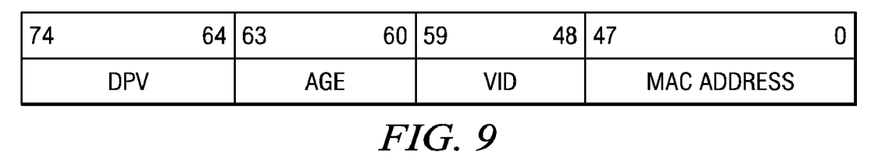
FIG. 9 is a diagram illustrating memory organization for a system according to embodiments of the present invention.

The structure of the ATU entries is shown in FIG. 9. The table is formed of entries containing a Source MAC address, Destination Port Vector (DPV), and Entry State as shown in FIG. 9.

The table learns the port number that an end station is connected to by learning packet Source Addresses (SA) along with the port they on which they arrive. The information is stored in a table entry and accessed by the hashed Destination Address (DA) 812.

The memory controller 814 checks the Age field 816 of each entry. If the location is vacant, the controller 814 writes the entry, adding it to the group. If the table is full, a LRU (least-recently used) algorithm eliminates the LRU entry from among a group of four entries by comparing the ages of the entries and eliminating the oldest. Management packets are not learned but are forwarded to the CPU port.

Bit 40 of the MAC is designated as the Multicast bit. When it is not set we are in Unicast mode and the four-bit Age field of the table entries is used to age the entry, as will be explained in greater detail below.

Figure 10:
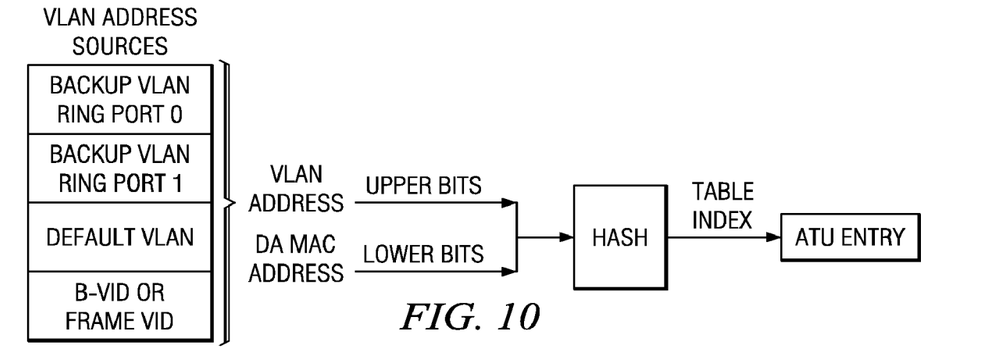
FIG. 10 is a diagram illustrating exemplary ATU table addressing according to an embodiment of the present invention.

The table address is a hashed concatenation of the MAC address and the VID as shown in FIG. 10. For each incoming packet, the memory controller uses the hash address to read the ATU. Table entries are organized in groups of four to reduce hash collisions as is done on the (Marvell) switch device 502. Therefore, table accesses read four, eight byte entries for a total of 32 bytes.

For a lookup, the memory controller 814 reads the four table entries that compose the group and stores them in a local FPGA SRAM. The controller 802 compares the packet MAC with the MAC field at 818 and the packet VID with the VID field. If any of the four matches and the valid bit is true, the DPV is returned. If there are no matches, the controller must update the group with the new packet information. The controller updates the table by the LRU algorithm. The controller compares the age field for each group entry and overwrites the one with the lowest number.

A table age manager 816 ages all table entries periodically by reading each table location and decrementing the age field for each occupied location. When a new entry is written to the table or an existing entry is accessed the controller sets the age field to the maximum value of seven. Unused entry locations or entries aged to a value of zero are marked as invalid and may be overwritten.

A Refresh control scans the entire table according to a user-selected period and decrements the age of each entry by one. Entries that age to a value of zero are cleared by resetting the valid bit.

As discussed above, the MAC2VLAN ID table is located in external memory and is used associate destination MAC addresses with the VLAN IDs. The table prevents unnecessary flooding and specifies new paths. The table contains up to 8192 entries that are added during RRR packet processing. The table controller checks the table for the presence of a MAC address and on a miss, during the address learning process only, state 7, in the flow chart, adds the entry in the format shown in FIG. 11.

Figure 11:
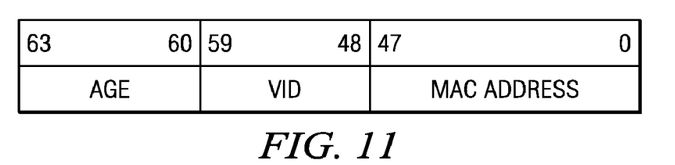
FIG. 11 is an exemplary MAC-to-VLAN ID table entry according to an embodiment of the present invention.

The MAC address for the entry is hashed for a table index value and when checking the table the MAC field id compared to the complete SA MAC value.

Figure 12:
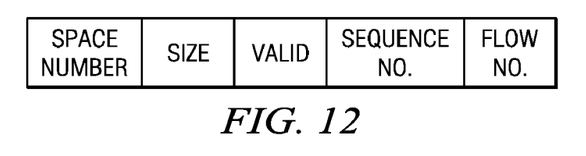
FIG. 12 is an exemplary packet buffer storage table according to an embodiment of the present invention.

An area of the DDR 814 is allocated to buffer packets forwarded so that lost packets may be forwarded again. The area may hold a number of packets and each allocation space will hold a maximum sized packet. Spaces may be allocated successively and a packet identifier entered in the storage table. A possible packet storage table entry is shown in FIG. 12.

On entry the VALID field in the table is set along with the space number and packet identification information. When the forwarding space is full, successive packets wrap around from first to last. On forwarding the VALID field is reset to zero. Newly forwarded packets are placed in the first available table space or overwrite the next location when the buffer is full. A mechanism of dropped packet notification may be employed.

The PPC PCI port is connected to a PCI port 817 on the FPGA. The processor uses the PCI to access registers, the ATU and VTU. The PCI core application logic contains data and address busses and signals that allow the PCI port to read and write the external memory and FPGA memory and registers. All PCI transfers are 32 bits. Burst transfers are supported. Access conflicts are arbitrated. Accesses to the 67 Bit wide ATU are made in three successive transfers with the LS Bytes first. The 48 Bit Bridge address is accessed in two transfers of three bytes each with the least significant bytes first. The header memory is accessed in one byte widths. The PPC configures the PCI Target including the BAR.

Figure 13:
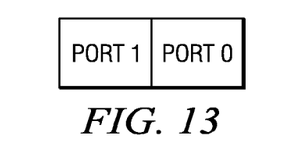
FIG. 13 is an exemplary port status register according to an embodiment of the present invention.

Changes in the Link status are detected by a CPU interrupt or the CPU polling MAC status. The Link status is written by the processor over the PCI bus into the FPGA Port Status Register shown in FIG. 13. The FSM checks the status register for a port link status while processing RRR.

Exemplary FPGAs that may be used in accordance with embodiments of the present invention are a Xilinx Spartan IIIE XC3S250 containing 50000 gates, or an Altera Cyclone II EP2C5208PQFPC8.

The GMII interface 802 is full-duplex with eight bits in each direction. It operates at 125 MHz and is used to receive and send packets switched by the switch ASIC. As discussed above, the controller operates a FIFO 804, 808 in each direction. The interface controls the flow of data over the GMII and writes the incoming FIFO and reads data from the outgoing FIFO. Each FIFO is built using an 18K Bit block RAM.

The FSM performs the processing and accesses the appropriate tables during the course of processing. As soon as the FIFO 804 is not empty the FSM reads the header and proceeds to store it in registers and then to process it. Local packets will not be headed with MAC-in-MAC encapsulation while Ring packets will include the header.

The 21 Byte, MAC-in-MAC tag is the default encapsulation header and also the switch ASIC header and is stored in a RAM whose contents do not change. For processing, the tag is copied to the RAM containing the incoming packet header and both are accessed by the FSM during processing. The RAM will be compiled to be 48 bits wide by six locations. Some locations will be only partially used.

The FSM reads the first four fields or the packet header and stores the information in register(s) 719. The FSM checks the port link status register 720 to verify that the adjacent destination port is up. If the link has a fault then we replace the B-VID in memory field in the MAC-in-MAC with the Backup VLAN register contents (Step 5, FIG. 7).

If there is no link fault, the 64 K Byte MAC2VLANID table is checked to see if the DA (destination address) is there (Step 4). If it is, then the Backup VLANID from the table entry is used for the working VID value (Step 5). If there is no table hit, then the Default VID register contents are used for the working VID (Step 22).

The table is indexed using the hashed MAC address from 48 bits to 12 bits. A MAC can be associated with multiple VLAN addresses at different times. In the event of a collision in table accesses, the table MAC entry must be compared with the MAC key to ensure identity.

Test the Tunnel bit in the I-SID header field at 820 to see if the packet is in tunnel mode (Step 20). If we are in tunnel mode then check the contents of the Bridge address register 822 to verify that it matches the Bridge address field of the header (Step 10). If there is no match, then tunnel processing is complete. If there is a match, then clear the I-SID tunnel bit.

If the tunnel bit is clear, the packet is not in tunnel mode and we learn the source MAC address (Step 7). A final test checks whether the working VID matches one of the Backup VID values (Step 8). If there is no match, we move on to the forwarding process. If there is a match, then record the SA MAC and VID to the MAC2VID table (Step 9).

Resume the processing at Step 11 where we index the ATU using the Backup VLAN. If there is a hit proceed to Step 24 and proceed (or not) with de/encapsulation. Otherwise access the table again using the Default VLAN key. If that entry is found, use the DPV field as in Step 13 to determine whether the port is Local or Ring. If it's Local, go to Step 24 and proceed (or not) with de/encapsulation. Otherwise, if the entry is found by neither key proceed to step 14 to flood.

Packets are then forwarded to either the Ring ports or both the Ring ports and the Local port, depending on the check if the source address is the same as the bridge address. If the frame VID has changed, as determined in step 16, then the MAC-in-MAC de/encapsulation proceeds. Otherwise, it is determined in step 17 whether the outgoing port is the same as the incoming port. If so, the frame is destroyed. Otherwise, de/encapsulation can proceed.

Ring packets arrive at the GMII ingress port already MAC-in-MAC encapsulated. The first step is then to check the link failure register 819 for the port. If there is a link failure, set the packet I-SID tunnel bit and jump to Step 5. Lacking a link failure set the working VID to B-VID and move to Step 21.

The external memory could be a 128 K Byte SRAM that costs about $4. It could also be implemented in FLASH or DDR. The external memory stores the 64 K Byte ATU and the 36 K Byte VTU. It also buffers a number of outgoing packets of the maximum size of 1632 Bytes so that if a packet were lost during transmission it could be resent from the buffer. Both FPGA families have SRAM memory blocks that are used for the FIFO cells, but that can also support the aforementioned storage requirements.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. An Ethernet ring network, comprising:
a plurality of ring switches that each include a ring recovery controller configured to detect an adjacent link failure and autonomously re-route traffic on the Ethernet ring using an alternate path virtual local area network (VLAN), the ring recovery controllers configured to define a plurality of virtual local area networks each preconfigured for a specific link failure so that each link is associated with a respective virtual local area network defining an alternate path between the respective adjacent switches via the other links and switches in the ring.

2. An Ethernet ring network in accordance with claim 1, wherein a ring recovery controller on a switch adjacent to a failed link is configured to autonomously reroute said traffic independently of other switches.

3. An Ethernet ring network in accordance with claim 2, wherein each ring switch is configured to include a MAC-to-VLAN identification table for associating a destination MAC address with a VLAN and identifying an appropriate VLAN to send traffic toward the destination to prevent packet backtracking on a suboptimal path and unnecessary flooding on the alternate path VLAN.

4. A telecommunications method, comprising:
defining a plurality of virtual local area networks (VLANs) on an Ethernet ring, the plurality having a number equal to the number of links in the Ethernet ring and being in one-to-one correspondence with the links, each of the VLANs defining respective paths around the ring between adjacent switches without including the path directly between the adjacent switches;
detecting a link failure on the Ethernet ring from a switch adjacent the failed link;
routing traffic around the ring on a VLAN defined for the failed link between the switches adjacent the failed link, said routing comprising the detecting switch adjacent to the failed link autonomously routing the traffic onto the failed link VLAN.

5. A telecommunications method in accordance with claim 4, wherein said autonomously routing comprises the detecting switch adjacent to the failed link routing the traffic onto the failed link VLAN independently of other switches.

6. A telecommunications method in accordance with claim 5, wherein said routing the traffic onto the failed link VLAN comprises routing traffic using frame encapsulation and a tunneling mechanism for rerouted traffic together with a mechanism for detecting when frames exit a tunnel.

7. A telecommunications method in accordance with claim 6, wherein said routing the traffic onto the failed link VLAN further comprises adding a MAC header to Local traffic that is to travel on the ring.

8. A telecommunications method in accordance with claim 7, wherein said routing the traffic onto the failed link VLAN further comprises stripping ring traffic of a MAC header for transport locally.

9. An Ethernet switch, comprising:
a switching control for routing traffic received at the switch; and
a ring recovery control for responding to a failure of an attached link by autonomously causing traffic to be routed on an alternate virtual local area network (VLAN) defining a path between the Ethernet switch and a switch across the failed attached link via the other links and switches in the ring, the ring recovery control being adapted to define a plurality of alternate VLANs in combination with the other ring recovery controls in the ring, each alternate VLAN preconfigured for a specific link failure so that each link is associated with a respective alternate VLAN defining a path between respective adjacent switches via the other links and switches in the ring.

10. An Ethernet switch in accordance with claim 9, wherein the ring recovery control is configured to cause said traffic to be routed onto the alternate virtual local area network independently of coordination with other switches.

11. An Ethernet switch in accordance with claim 9, wherein the ring recovery control comprises an encapsulation control for adding frame encapsulation to ring traffic.

12. An Ethernet switch in accordance with claim 11, wherein the ring recovery control is configured to activate encapsulated tunneling for rerouted traffic.

13. An Ethernet switch in accordance with claim 9, wherein the ring recovery control comprises means for sending VLAN-routed, forward traffic received at the switch back along the VLAN towards the forward traffic destination.

14. An Ethernet switch in accordance with claim 13, wherein the ring recovery control further comprises means for sending VLAN-routed, return traffic received at the switch along the VLAN towards the return traffic destination without backtracking along a suboptimal path for the VLAN.

15. A telecommunications system, comprising:
a plurality of switches defining an Ethernet ring;
a plurality of virtual local area networks (VLANs) defined on the Ethernet ring, each VLAN defining a respective path around the Ethernet ring linking adjacent switches via the other switches in the ring, and each VLAN being preconfigured as a corresponding backup for a distinct, respective link of the Ethernet ring; and
a ring recovery system configured to recover the Ethernet ring from a link failure by rerouting traffic to a destination on the Ethernet ring via a VLAN not including a failed link, the ring recovery system including a ring recovery control on each of the plurality of switches, each ring recovery control configured to detect a failure of an adjacent link and autonomously reroute traffic onto the corresponding backup VLAN.

16. A telecommunications system in accordance with claim 15, wherein each ring recovery control is configured to reroute said traffic independently of other switches.

17. A telecommunications system in accordance with claim 16, wherein the ring recovery system is configured to reroute said traffic using frame encapsulated tunneling.

18. A telecommunications system in accordance with claim 17, wherein the ring recovery system is configured to identify local and ring traffic and perform frame encapsulation for local-to-ring traffic and perform de-encapsulation for ring-to-local traffic.

* * * * *